United States Patent [19]

Alleman

[11] 4,070,231
[45] Jan. 24, 1978

[54] WET GLYCOL STRIPPED WITH FUEL GAS

[75] Inventor: Carl E. Alleman, Bartlesville, Okla.

[73] Assignee: Phillips Petroleum Company, Bartlesville, Okla.

[21] Appl. No.: 744,059

[22] Filed: Nov. 22, 1976

Related U.S. Application Data

[62] Division of Ser. No. 560,393, March 20, 1975, Pat. No. 4,010,065.

[51] Int. Cl.$^2$ .......................... B01D 1/16; B01D 1/00; B01D 53/02; C07C 29/26
[52] U.S. Cl. .......................... 159/47 R; 159/16 R; 55/32; 62/20; 252/372; 48/180 C
[58] Field of Search .......................... 159/4, 31–33, 159/46, 48, 16 R, 16 A, 47 R; 203/18; 55/32, 33, 29; 62/17, 20; 252/374

[56] References Cited

U.S. PATENT DOCUMENTS

| | | | |
|---|---|---|---|
| 2,428,643 | 10/1947 | Young | 159/31 |
| 3,182,434 | 5/1965 | Fryer | 159/31 |
| 3,233,390 | 2/1966 | Meyers | 159/31 |
| 3,348,601 | 10/1967 | Hill | 159/31 |
| 3,370,636 | 2/1968 | Francis | 159/31 |
| 3,397,737 | 8/1968 | Gravis | 159/31 |
| 3,428,423 | 2/1969 | Egbert | 159/16 R |
| 3,450,603 | 6/1969 | Meyers | 159/31 |
| 3,841,382 | 10/1974 | Gravis | 159/16 R |

*Primary Examiner*—Norman Yudkoff
*Assistant Examiner*—Martin G. Mullen

[57] ABSTRACT

Improved process and apparatus for drying oxygen-containing streams, particularly wet air streams, are provided wherein these streams are contacted with glycols. The regeneration of glycols and in particular the removal of oxygen from the glycols is effected in a first step at a temperature below the oxidation temperature of the glycols, and then the removal of water from the glycols is effected in a second step, preferably by heating the wet glycols.

15 Claims, 1 Drawing Figure

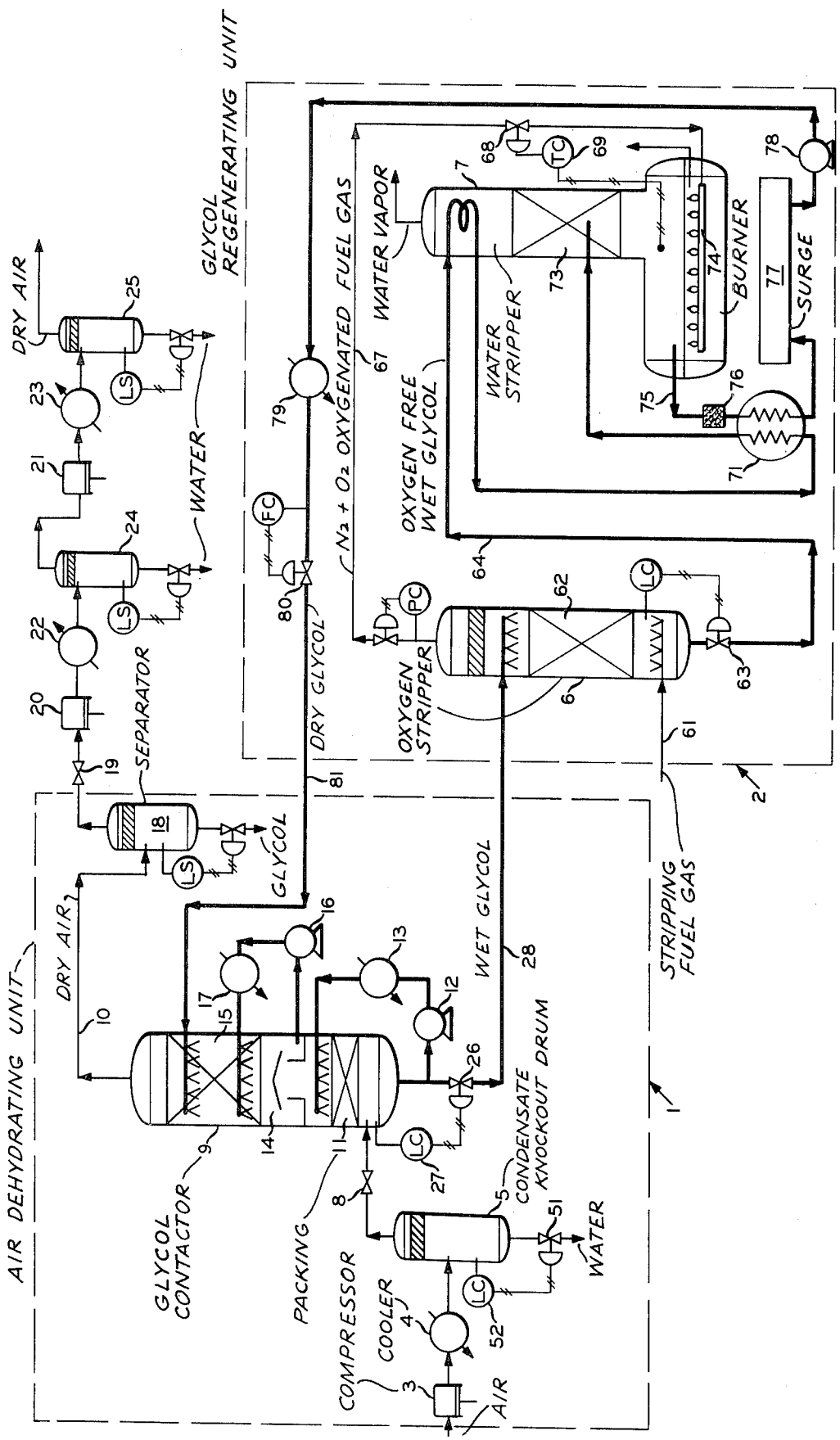

WET GLYCOL STRIPPED WITH FUEL GAS

This is a divisional application of my copending patent appliation Ser. No. 560,393, filed Mar. 20, 1975, now U.S. Pat. No. 4,010,065.

This invention relates to the drying of oxygen-containing streams.

In one aspect this invention relates to the drying of wet air. In another aspect this invention relates to the regeneration of wet glycols.

BACKGROUND OF THE INVENTION

In the chemical and in particular the petroleum industry, it is frequently necessary to remove water from air before it can be used. Dried air, for instance, is used to mix with residual natural gas in order to control the heating value of this gas. Another application of dry air is in the field of tools operating with compressed air.

Moist air, particularly when compressed to high pressure, can be very corrosive to equipment. Compressing air of 20 percent relative humidity, atmospheric pressure and a temperature of 80° F to 100 psia and a temperature of 100° F, for instance, increases the relative humidity of such air to 74 percent.

It is well known in the art that moist air can be dried by contacting it with a glycol. During this process, the glycol is enriched with water and also with some air. In order to reuse the glycol, it is common practice to remove the water by heating the used wet glycol, e.g., to a temperature of 380° F when using triethylene glycol. After a certain period of time, however, the glycol must be replaced. Among other reasons, the replacement of the glycol is necessitated by the production corrosive acidic by-products.

THE INVENTION

It is an object of this invention to provide a new process and apparatus for drying free oxygen-containing streams.

Another object of this invention is to improve a process and apparatus for drying free oxygen-containing gas streams by contacting them with glycol.

A further object of this invention is to provide a process and apparatus to regenerate wet glycols.

These and other objects, features, advantages, and embodiments of this invention will become apparent to a person skilled in the art from the following detailed description of the invention, the appended claims, and the attached drawing, which schematically shows an air-drying unit to carry out the process of the invention.

In accordance with this invention I have now found that the period of use of a glycol for drying wet free oxygen-containing streams before having to be replaced can be prolonged if the free oxygen contained in the used wet glycol is first removed from the used wet glycol at a temperature below the temperature where substantial oxidation of the glycol occurs and thereafter the water is removed from the wet glycol. By this procedure both the period of use of the glycol is prolonged and the formation of corrosive by-product is reduced.

In carrying out the overall process of this invention which consists essentially of three basic steps, a wet, free oxygen-containing stream is first contacted with a dry glycol under conditions such that a drying of the otherwise wet stream is achieved by absorption of water into the glycol together with some of the free oxygen. Thereafter the resulting wet glycol containing free oxygen is treated in a stripping zone whereby there is effected a removal of the free oxygen from the wet glycol at a temperature below that at which substantial oxidation of the glycol would otherwise occur. Following stripping of the free oxygen from the still wet glycol, the resulting wet glycol is then treated to remove the entrained water therefrom whereby there is obtained a dry glycol suitable for return to the initial wet gas stream drying operation.

The drying of a water-wet stream with a glycol is per se a well-known technique in the art as shown by U.S. Pat. No. 2,428,643. As such the specific conditions for carrying out this operation are not critical to the instant invention other than that they achieve both a drying of the stream by absorption of water into the glycol together with some of the free oxygen.

Critical to the instant invention is, however, the stripping of the free oxygen from the wet glycol. In carrying out this step of the process of this invention, the wet glycol having free oxygen therein is first stripped with a gas selected from the group consisting of hydrocarbon gases, fuel gases, inert gases and mixtures thereof to remove the free oxygen. It is presently preferred to use fuel gas for the initial stripping of the wet glycol stream. When so employed, the resulting fuel gas containing free oxygen is the separated from the wet glycol and burned to provide heat. Thus, effluent from the stripping operation can be employed as the source of heat to remove the water from the stripped wet glycol. Other stripping gases besides fuel gas include nitrogen, carbon dioxide, and the like.

Following stripping of the wet glycol to remove free oxygen therefrom, the resulting stripped glycol is treated to remove the entrained water from the glycol. Preferably in accordance with this invention, the water is removed from the wet glycol by heating.

In general, the operating conditions for carrying out (1) initial drying of the wet air, (2) the oxygen stripping operation, and (3) the glycol drying are as follows:

Table I

| Step | Temperature | Pressure |
| --- | --- | --- |
| 1. Air drying | 60–100° F | Atmospheric-500 psig |
| 2. Oxygen stripping | 70–150° F | 5–100 psig |
| 3. Glycol drying | 300–400° F[(1)] | 0–20 psig |

[(1)]Dependent on the glycol used and the degree of air dryness desired (dew point).

In order to conserve energy, it is presently preferred to put the hot glycol freed from water in the second step of the glycol regeneration into indirect heat exchange relationship with the wet glycol coming from said first step of glycol regeneration. Furthermore, this wet glycol can be put in indirect heat exchange relationship with the water vapors generated in the second step of glycol regeneration.

The term "glycol" is used herein to define any dihydroxy alcohol or a mixture of such compounds. The glycols employed usually have a boiling point below about 550° F. In the embodiment relating to drying gas streams the term refers to those glycols that can be used for drying purposes. The preferred group of glycols to which this invention is applicable are those having 2 to about 8 carbon atoms per molecule, the di-, tri-, tetraethylene glycols and mixtures thereof being particularly preferred. Examples include ethylene glycol, propylene glycol, diethylene glycol, dipropylene glycol, triethylene glycol, and the like.

Further in accordance with this invention, I have also found that wet glycols also containing free oxygen can be effectively regenerated with less adverse side effect in an apparatus comprising a source of wet, oxygen-containing glycol, a first stripping unit for stripping oxygen from the wet oxygen-containing glycol, a second stripping unit for removing water from the wet glycol, first conduit means connecting the glycol source with a first inlet of said first stripping unit, second conduit means for connecting a first outlet of said first stripping unit for the wet glycol with an inlet of the second stripping unit, a source for a stripping gas selected from the group consisting of hydrocarbon gases, fuel gases, inert gases and mixtures thereof, a gas inlet to said first stripping unit connected to said source for a stripping gas, a gas outlet for the stripping gas containing oxygen removed from the wet glycol, and third conduit means for withdrawing regenerated glycol from said second stripping unit.

In accordance with one embodiment of this invention, the source of water-rich oxygen-containing glycol is an air dryer comprising a first inlet for wet air, a first outlet for dry air, a second inlet for dry glycol, and a second outlet for wet glycol; the second outlet of the air dryer is connected to the inlet of the first stripper and an outlet of the second stripper unit is operatively connected to the second inlet of the air dryer.

The presently preferred apparatus of this invention comprises a source of a fuel gas operatively connected to a fuel gas inlet of the first stripping unit such as to permit flow of the fuel gas through and in contact with the glycol present in the first stripping unit, a fuel gas outlet from the first stripping unit, a fuel gas burner operatively connected to the second stripping unit such as to make possible the heating of the wet glycol in the second stripping unit, and a gas line connecting the fuel gas outlet of the first stripping unit with said gas burner. Most preferably, the gas line is provided with a temperature-controlled valve, the temperature-controlling unit of which senses the temperature of a glycol reboiler in said second stripping unit.

The presently preferred apparatus of this invention has the second conduit means arranged in heat exchange relationship with the top portion or vapor phase of said second stripping unit or with the hot dry glycol effluent coming from said second stripping unit, or with both of thses. The indirect heat exchange of the wet glycols with the vapor phase of the second stripping unit is preferably carried out upstream of the indirect heat exchange of the wet glycols with the dry glycol coming from the second stripping unit.

The invention will be more fully understood from the following description of the schematic drawing of an apparatus to carry out the process of this invention.

The apparatus consists essentially of an air dehydrating unit 1 and a glycol regeneration unit 2. Air is compressed by a compressor 3 and cooled in a cooler 4. The air then is passed through a knobk-out vessel 5 to remove condensed water. The water is discarded from the vessel 5 via a valve 51 which is operated by a level control unit 52.

The air then passes via a value 8 into a glycol contactor 9. The air, after having passed through the contactor, is removed from the top of the contactor 9 via a line 10. The air entering the contactor 9 is first passed through a first packed section 11 wherein the air is contacted with a glycol being withdrawn from the lower section of the contactor 9 by a pump 12 after having passed through a cooler 13. The air then is passed through a tray 14 and through a second packed portion 15. A portion of the glycol collected on the tray 14 is withdrawn by a pump 16 and passed through another cooler 17. This glycol is then reintroduced into the second packed portion 15. The dried air withdrawn via line 10 is passed through a glycol separator 18, a valve 19, and a series of compressors 20, 21, coolers 22, 23 and knock-out vessels 24, 25. More or fewer than two of each of these units can be present.

Water-rich glycol is withdrawn from the bottom portion of the contactor 9 via a valve 26 which is controlled by a level controller 27. This water-rich glycol is passed via line 28 to the upper portion of oxygen stripper 6. Fuel gas is introduced via line 61. This fuel gas countercurrently moves to a packed portion 62 of the oxygen stripper vessel 6 where it contacts the water-rich glycol. The temperature of the oxygen stripper 6 is maintained well below that temperature where signficant oxidation of the glycol would otherwise occur. Ordinarily this temperature is somewhat above that achievable with the available coolant (water or air) used in the glycol coolers. The temperature of the oxygen stripper desirably is below about 150° F. The resulting glycol stream free of free oxygen is then passed to water stripping unit 7. Preferably the glycol stream is first passed via line 64 into indirect heat exchange with the water vapors in the upper portion of the water stripping unit 7. The glycol is then passed through a heat exchanger 71 and from there into the packed portion 73 of the water stripping unit 7. The water-rich glycol is boiled in the water stripping unit 7 by a burner 74 into which the oxygen-containing fuel gas leaving the oxygen stripper 6 is fed via line 67. The quantity of fuel gas introduced into the burner 74 is controlled by a temperature-controlled valve 68. The temperature controller 69 senses the temperature inside of the bottom of the water stripping unit 7 and controls this temperature via valve 68.

The hot water-free glycol is removed from the water stripping unit 7 via line 75 and passed through an in-line filter 76 into the heat exchanger 71. From there the glycol is passed into a surge tank 77. From this tank the water-free glycol is withdrawn by a pump 78 and fed through a cooler 79, a flow control valve 80 and via line 81 back into the upper packed portion 15 of the glycol contactor 9.

The process conditions in the glycol contactor depend upon the air properties wanted. The higher the dew point reduction (more water removal) wanted, the purer the dry glycol to be used must be and the more of it that must be used. The pressure in the contactor will usually be given by the pressure of the dry air to be further used. Furthermore, the temperature should be low enough for good drying; however, not so low that the glycol becomes too viscous for good contacting. Usually, therefore, the contacting temperature should not be below about 60° F. The oxygen stripper is operated at a temperature at which essentially no oxidation of the glycol used occurs. To effectively remove the water from the wet glycols, these are boiled. The packed column is refluxed with condensed vapors to minimize the amount of glycol vapors lost with the effluent water vapor. The temperature depends upon the desired purity of the glycol, with an upper limit that avoids appreciable thermal decomposition of the glycol used. The following table shows typical glycols with some of their properties.

Table II

| Glycol | Normal Boiling Point, | Boiling Point of a 98 Wt. % Glycol/2 Wt. % H₂O | Estimated Initial Thermal Decomposition |
|---|---|---|---|
| Ethylene glycol | 387 | 342 | 329 |
| Diethylene glycol | 475 | 354 | 328 |
| Triethylene glycol | 549 | 327 | 404 |
| Tetraethylene glycol | 586 | — | >400 |

Contacting wet air at 100° F with triethylene glycol in a counter-current contactor so as to reach essentially equilibrium between entering glycol and exit air and circulating about 3 to 4 gallons of the glycol per pound of water contained in the inlet air through the contactor-regeneration loop will result in the dew point depressions shown in the following table:

Table III

| Triethylene Glycol Concentration in Wt. % (rest is water) | Average Depression of Dew Point of Air in ° F |
|---|---|
| 96 | 49 |
| 98 | 66 |
| 99 | 84 |
| 99.5 | 98 |

To further illustrate the invention, the following calculated example is presented.

EXAMPLE 15,000,000 standard cubic feet of air per day containing 1000 pounds of water vapor per million cubic feet of air is compressed and cooled by heat exchange to 25 psig and a temperature of 90° F. This air is fed to the bottom of a 20-foot high glycol drying unit contactor having a diameter of 4 feet and 3 inches. In this contactor the air is counter-currently contacted with 28 gallons of dry ethylene glycol per minute. The contactor is provided with two inter-coolers to remove the heat of absorption of water vapor. The dry air overhead vapor containing about 15 pounds of water vapor per million cubic feet of air is passed through a knock-out drum where entrained glycol is removed from the air. The thus-produced dry air is available for planned use, e.g., for mixing the dry air with residual natural gas to control the heating value thereof.

Wet liquid glycol is withdrawn from the bottom of the contactor at a temperature of 90° F and is sprayed into the top of a 10-foot-high oxygen stripper having an 18-inch diameter. The stripper is packed with ceramic rings. 450 standard cubic feet per hour of dissolved oxygen and nitrogen is stripped from the glycol by introduction of 50 standart cubic feet per minute of fuel gas. The stripper operates at about 105° F and at a pressure of 20 psig. Stripper overhead gases consisting essentially of the fuel gas, nitrogen, and oxygen are passed to a glycol regenerator where these gases are fed through a fired reboiler. The fuel gases are burned in this reboiler. The wet glycol, stripped of oxygen as well as nitrogen, is then passed to the glycol regenerator after heat exchange, as described above in connection with the drawing. The reboiler duty of the glycol regenerator is about 2.5 MMBTU/hr. In this regenerator the wet glycol is boiled, water vapors leave the regenerator and liquid glycol is removed from the regenerator at a temperature of about 375° F. This hot glycol is cooled by heat exchange and is pumped back to the contactor.

Reasonable variations and modifications which will be apparent to those skilled in the art can be made in this invention without departing from the spirit and scope thereof.

I claim:

1. A process for drying gas streams containing free oxygen and water which comprises
   a. contacting said gas streams with a glycol to produce a dry gas stream and a wet glycol stream containing free oxygen;
   b. removing free oxygen from said wet glycol stream by stripping said wet glycol at a temperature in the range of about 70° to 150° F;
   c. removing water from said wet glycol to obtain dry glycol; and
   d. thereafter recovering the dry glycol.

2. A process in accordance with claim 1 wherein the water is removed from said water-rich glycol by heating said wet glycol to a temperature in the range of about 300° to 400° F at a pressure of 0 to about 20 psig.

3. A process in accordance with claim 1 wherein said glycol has 2 to about 8 carbon atoms per molecule.

4. A process in accordance with claim 1 wherein said gas stream to be dried consists essentially of air and water.

5. A process in accordance with claim 1 wherein said glycol is selected from the group consisting of di-, tri- and tetraethylene glycols and mixtures thereof.

6. A process in accordance with claim 1 wherein said glycol has a boiling point of less than about 550° F.

7. A process in accordance with claim 1 wherein the oxygen is removed from said wet oxygen-containing glycol by stripping said glycol with a gas selected from the group consisting of hydrocarbon gases, fuel gases, inert gases, and mixtures thereof.

8. A process in accordance with claim 1 wherein said gas is a fuel gas.

9. A process in accordance with claim 8 wherein said fuel gas containing oxygen is burned so as to heat the wet glycol free of free oxygen in order to remove the water therefrom.

10. A process in accordance with claim 1 wherein said glycol is reintroduced into said step of contacting the gas stream to be dried with the glycol.

11. A process in accordance with claim 1 wherein said wet gas stream is a wet air stream, wherein said glycol is triethylene glycol, wherein water-rich triethylene glycol is introduced into an oxygen stripper operated near ambient temperature while fuel gas is passed through said stripper, wherein the resulting oxygen-free wet triethylene glycol is heated to remove water from said triethylene glycol and wherein said triethylene glycol is recovered.

12. A process in accordance with claim 1 wherein the wet triethylene glycol is heated by burning said fuel gas containing some oxygen which is removed from the oxygen stripper.

13. An apparatus for drying a wet, oxygen-containing gas stream comprising
   a. a glycol contactor means for contacting said gas stream with glycol having first inlet means for introducing said gas stream, first outlet means for withdrawing a dried gas stream, second inlet means for introducing dry glycol and second outlet means for withdrawing oxygen-containing wet glycol,
   b. a first stripping unit means for stripping oxygen from said wet oxygen-containing glycol maintained at a temperature of about 70° to 150° F;

c. a second stripping unit means for removing water from said wet glycol;
d. first conduit means connecting said second outlet with a wet glycol inlet of said first stripping unit;
e. a source means for a stripping gas selected from the group consisting of hydrocarbon gases, fuel gases, inert gases and mixtures thereof;
f. a gas inlet means into said first stripping unit means connected to said source for a stripping gas;
g. a gas outlet means from said first stripping unit means;
h. second conduit means for connecting a wet glycol outlet of said first stripping unit means with a wet glycol inlet of said second stripping unit means; and
i. third conduit means for withdrawing dry liquid glycol from said second stripping unit means.

14. Apparatus in accordance with claim 13 wherein the outlet of said second stripping unit means for the dry liquid glycol is connected operatively with said second inlet.

15. Apparatus in accordance with claim 13 wherein said source means for a stripping gas is a fuel gas source, said apparatus comprising
a. fuel gas burner means operatively connected to said second stripping unit means for heating the wet glycol; and
b. a gas line connectng said gas outlet means of said first stripping unit means with said burner.

* * * * *